(12) United States Patent
Hellig et al.

(10) Patent No.: US 8,397,834 B2
(45) Date of Patent: Mar. 19, 2013

(54) OSCILLATING TOOL WITH VIBRATION DAMPING SYSTEM

(75) Inventors: Mark Hellig, Winnenden (DE); Juergen Blickle, Goeppingen (DE); Alfred Schreiber, Kirchheim (DE)

(73) Assignee: C. & E. Fein GmbH (DE)

( * ) Notice: Subject to any disclaimer, the term of this patent is extended or adjusted under 35 U.S.C. 154(b) by 263 days.

(21) Appl. No.: 12/726,623

(22) Filed: Mar. 18, 2010

(65) Prior Publication Data

US 2010/0236806 A1 Sep. 23, 2010

(30) Foreign Application Priority Data

Mar. 18, 2009 (DE) .................. 10 2009 014 970

(51) Int. Cl.
*B25F 5/00* (2006.01)

(52) U.S. Cl. ........ 173/162.1; 173/49; 173/109; 173/210

(58) Field of Classification Search ............... 173/162.2, 173/162.1, 210, 211, 201, 104, 109, 49
See application file for complete search history.

(56) References Cited

U.S. PATENT DOCUMENTS

| | | | | | |
|---|---|---|---|---|---|
| 3,706,474 | A | * | 12/1972 | Neuenburg | 299/38.1 |
| 4,282,938 | A | * | 8/1981 | Minamidate | 173/162.2 |
| 4,534,419 | A | * | 8/1985 | Vural | 173/1 |
| 4,711,308 | A | * | 12/1987 | Blaas et al. | 173/162.2 |
| 4,871,033 | A | * | 10/1989 | Odoni et al. | 173/178 |
| 5,385,052 | A | * | 1/1995 | Hofmann | 73/514.04 |
| 5,927,407 | A | * | 7/1999 | Gwinn et al. | 173/162.2 |
| 6,000,310 | A | * | 12/1999 | Shilkrut et al. | 83/615 |
| 6,421,880 | B1 | * | 7/2002 | Prajapati et al. | 16/431 |
| 6,962,211 | B2 | * | 11/2005 | Daubner et al. | 173/162.2 |
| 7,100,706 | B2 | * | 9/2006 | Meixner et al. | 173/162.2 |
| 7,204,322 | B2 | * | 4/2007 | Sakai | 173/162.1 |
| 7,340,985 | B2 | * | 3/2008 | Claesson et al. | 82/163 |
| 7,395,871 | B2 | * | 7/2008 | Carrier et al. | 173/1 |
| 7,513,317 | B2 | * | 4/2009 | Satou | 173/162.2 |
| 7,637,328 | B2 | * | 12/2009 | Sato | 173/162.2 |
| 7,721,390 | B2 | * | 5/2010 | Pfeiffer et al. | 16/426 |
| 8,016,047 | B2 | * | 9/2011 | Ookubo et al. | 173/162.2 |
| 8,047,302 | B2 | * | 11/2011 | Berger et al. | 173/1 |
| 2003/0220058 | A1 | | 11/2003 | Pollak et al. | |
| 2005/0279518 | A1 | | 12/2005 | Kawamoto et al. | |
| 2007/0094877 | A1 | | 5/2007 | Bohne et al. | |
| 2008/0179152 | A1 | | 7/2008 | Moessnang | |
| 2008/0179797 | A1 | | 7/2008 | Manschitz et al. | |
| 2009/0311952 | A1 | | 12/2009 | Zaiser | |

FOREIGN PATENT DOCUMENTS

| | | |
|---|---|---|
| DE | 102004050800 A1 | 4/2006 |
| DE | 102006059336 A1 | 6/2008 |
| DE | 102007000057 A1 | 8/2008 |
| DE | 102007018466 A1 | 10/2008 |
| EP | 1952951 A2 | 8/2008 |
| WO | 2005102605 A1 | 11/2005 |
| WO | 2008128804 A1 | 10/2008 |

* cited by examiner

*Primary Examiner* — Scott A. Smith
(74) *Attorney, Agent, or Firm* — St. Onge Steward Johnston & Reens LLC

(57) ABSTRACT

An oscillating tool comprises a housing that accommodates a motor which for driving a tool is coupled with a drive shaft via an oscillation drive, for driving it about its longitudinal axis rotatingly oscillatingly. For reducing vibrations, there is provided an inertial mass that is movably held on the housing via at least one spring element.

15 Claims, 2 Drawing Sheets

OSCILLATING TOOL WITH VIBRATION DAMPING SYSTEM

BACKGROUND OF THE INVENTION

The present invention relates to an oscillating tool with a housing that accommodates a motor which for driving a tool is coupled with a drive shaft via an oscillation drive for driving it rotatingly oscillating about its longitudinal axis.

An oscillating tool of that kind is known from WO 2008/128804 A1.

In the case of the known oscillating tool, the motor couples an oscillation drive in the form of an eccentric drive with a drive shaft for causing it to move about its longitudinal axis rotatingly oscillating.

A mass-balancing arrangement intended to balance vibrations comprises an amplitude mass that is slidably arranged in a slide guide, and which is acted upon by the eccentric cam transmission. The amplitude mass performs an exclusively translational movement for which purpose the slide guide comprises a guide plate with a guide track, and a guide pin guided in the latter.

Oscillating tools of that kind can be used in diverse ways, for example for grinding or else for sawing or cutting. A usual range of oscillation frequencies is between approximately 5,000 to 25,000 oscillations per minute, a typical oscillation angle is between approximately 0.5° and 7°.

Hand tools of the before-mentioned kind provide a high degree of flexibility as regards their possible applications. However, it has been found that vibrations may occur in such hand tools of that kind that use a vibration drive, which may impair the ease of handling and which may be disagreeable to a user.

Efforts have therefore been made to keep vibrations in an oscillating tool as low as possible. Although the arrangement described at the outset has the effect to minimize oscillations, it has the disadvantage that slide guides are needed and that the elements constituting such guides are subject to a certain degree of wear, due to sliding friction. This may be a disadvantage especially when the oscillating tool is driven at a high frequency and, in certain cases, with a large oscillation angle.

SUMMARY OF THE INVENTION

In view of this it is a first object of the invention to disclose an oscillating tool which produces less vibrations.

It is a second object of the invention to disclose an oscillating tool which produces little vibrations and is well suited for continuous operation.

It is a third object of the invention to disclose an oscillating tool which allows for continuous operation and has little wear.

These and other objects of the invention are achieved in an oscillating tool of the type mentioned at the outset by an inertial mass that is movably held on the housing via at least one spring element.

The object of the invention is thus perfectly achieved.

Namely, according to the invention vibration damping is achieved by an arrangement where an inertial mass, held to be freely movable on one spring element, or a plurality of spring elements, is used for vibration damping. This provides the particular advantage that due to the inertial mass being suspended on at least one spring element a solution absolutely free of wear is achieved. Depending on the particular application, the spring-mass system constituted by the inertial mass and the respective spring element(s) can be suitably adapted to the resonant frequency or the operating frequency of the oscillation drive. In this way, especially effective vibration damping is achieved.

According to another embodiment of the invention, the inertial mass has an annular shape with an opening in which the inertial mass is fixed on the housing by at least two spring elements. The design of the opening preferably is such that the center of gravity of the inertial mass lies approximately on the motor axis.

This permits the inertial mass to be suspended on the housing in direct proximity to the drive so that especially effective vibration damping can be achieved. For suspension of the inertial mass, a single spring element or a plurality of spring elements can be provided.

If only one spring element is used, there may be provided, for example, a guide which ensures that the inertial mass can move in one plane only.

There may also be provided a plurality of spring elements which ensure that the inertial mass will move in one plane only.

According to another embodiment of the invention, at least one spring element is designed as a leaf spring.

It is possible in this way to guarantee high rigidity in a given direction so that it can be easily ensured that the inertial mass will move in one plane only.

According to another embodiment of the invention, the oscillation drive comprises an eccentric shaft that is enclosed by the inertial mass.

According to another embodiment of the invention, the motor comprises a motor shaft that is enclosed by the inertial mass.

In both cases, the inertial mass may be arranged in direct proximity to the point from which the vibrations predominantly emanate. Accordingly, effective vibration damping of the drive unit can be achieved in this way.

According to another embodiment of the invention, the inertial mass is arranged on an end of the motor opposite the tool Very effective vibration damping can be achieved in this way as well. The greater spacing from the point from which the predominant part of the vibrations emanate results in a longer lever arm so that a smaller inertial mass will be sufficient to achieve the desired vibration damping effect.

According to another embodiment of the invention, the spring elements have a variable spring characteristic.

This feature provides the advantage that the resonant frequency of the spring-mass system constituted by the inertial mass, the spring elements and the suspension can be suitably adapted to different vibration frequencies, if desired also as a function of load.

To this end, the spring characteristic of the spring elements may be made variable, for example by means of an electromechanical element, for example in the form of a piezoelectric element. Alternatively, a mechanical element may be provided, for example an adjustable screw intended to vary the pretension, for example.

Further, damping may be achieved, for example, by a friction element that acts on the inertial mass. The damping effect may be variable in this case. Detuning of the spring-mass system is rendered possible in this way.

Accordingly, a larger range of vibration frequencies can be damped.

According to a further embodiment of the invention, a plurality of inertial masses are received on the housing.

That feature provides the advantage that improved tuning is rendered possible for damping different frequencies.

Preferably, the inertial masses may be tuned to different resonant frequencies for this purpose.

According to another embodiment of the invention, the inertial masses are arranged on the housing one beside the other.

By modification of that arrangement, the inertial masses may be arranged in different positions in the area of the motor shaft, the eccentric shaft or on the end of the motor opposite the tool.

This permits an optimized adaptation to be achieved for minimizing the vibrations encountered.

Preferably, the resonant frequency of a spring-mass system constituted by the inertial mass in combination with the suspension on the spring elements is tuned to the operating frequency of the oscillating tool.

In this way, especially effective vibration damping is achieved.

It is understood that the features mentioned above and those yet to be explained below can be used not only in the respective combination indicated, but also in other combinations or in isolation in the invention, without leaving the scope of the invention.

BRIEF DESCRIPTION OF THE DRAWINGS

Further features and advantages of the invention will become apparent from the description that follows of a preferred embodiment, with reference to the drawing. In the drawing.

DETAILED DESCRIPTION OF THE PREFERRED EMBODIMENTS

Figure 1:
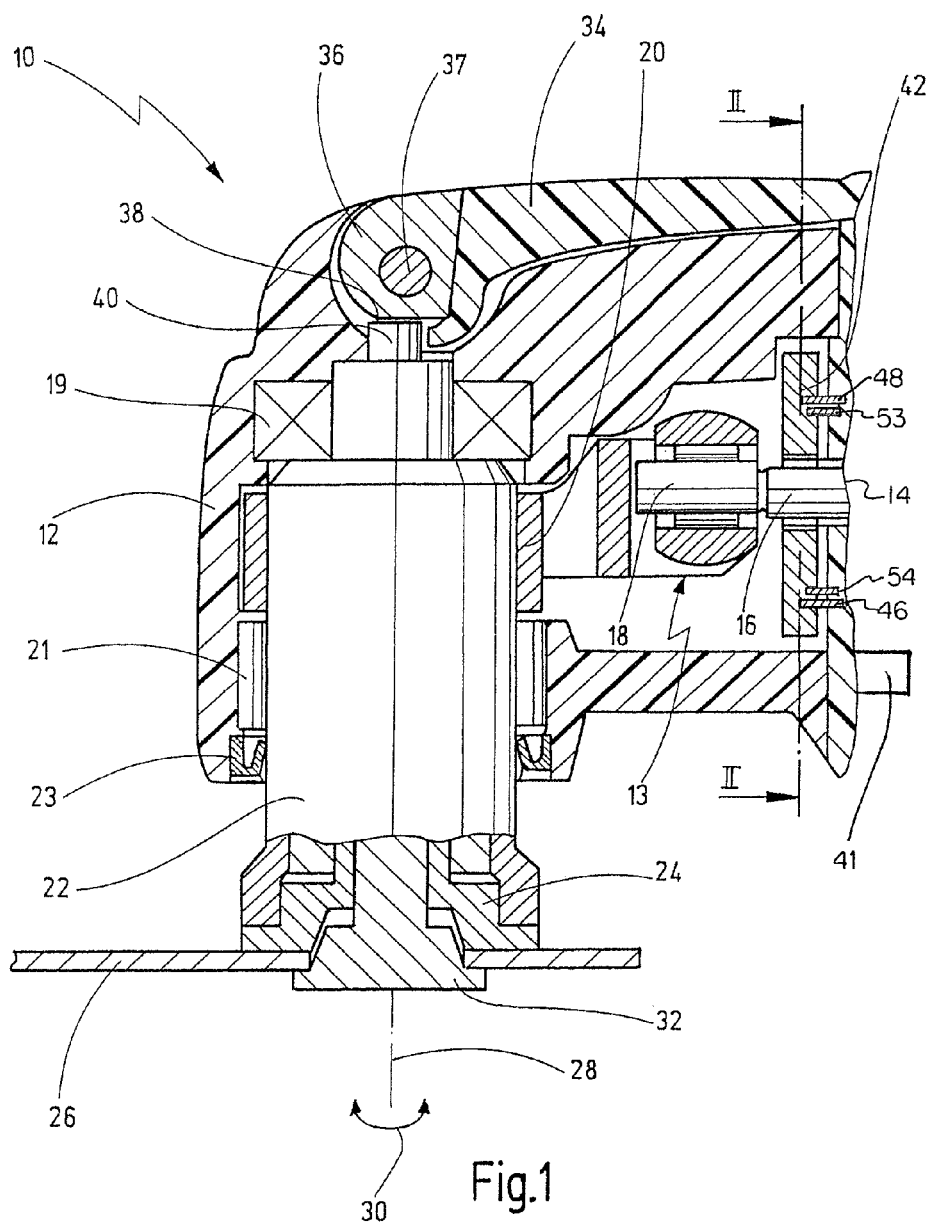
FIG. 1 shows a simplified partially sectioned representation of part of an oscillating tool according to the invention, in the area of its oscillation drive.

FIG. 1 shows a simplified view of an oscillating tool according to the invention, indicated generally by reference numeral 10.

The oscillating tool 10 comprises a housing 12, accommodating a motor 14 and an oscillation drive indicated generally by reference numeral 13, by which a drive shaft is driven about its longitudinal axis 28 in rotary and oscillating fashion, as indicated by double arrow 30. The shaft is driven at a high frequency of 5,000 to 25,000 oscillations per minute, for example, and with a small oscillating angle, typically in a range of between 0.5° and 7°.

The oscillation drive 13 translates the rotary movement of the motor shaft 16 into an rotatingly oscillating movement of the drive shaft 22. The drive shaft 22, being oscillatingly driven by an eccentric portion 18 connected with the motor shaft 16, is positively connected with a rocker fork 20 for that purpose.

The drive shaft 22 is seated in the housing 12 via bearings 19, 21, and is sealed from the outside by a seal 23. A flange 24 provided on the outer end of the drive shaft 22 is connected with the drive shaft 22 in form-locking fashion. A tool 26, for example a triangular grinding tool, can be clamped against the flange 24 by means of a clamping element 32, being thereby connected with the drive shaft 22 in form-locking fashion (in a manner not shown in detail).

The oscillating tool 10 further comprises a quick-acting changing device of the kind known in principle from WO 2005/102605 A1, to permit rapid changing of the tool without any need for an additional tool. The necessary clamping force is produced by a set of springs (not shown) accommodated in the drive shaft 22. A thrust pad 40 arranged on the upper end of the drive shaft 22 serves for relieving the set of springs so that the clamping element 32 can be pulled off the drive shaft 22 to permit the tool 26 to be changed. Displacing the thrust pad 40 is effected by a clamping lever 34 with an eccentric 36 that can be pivoted about an axis 37. The details of that quick-acting changing device are known in principle so that they need not be described here in more detail. For further details, reference is made to WO 2005/102605 A1, which is incorporated herein in full by reference.

Figure 2:
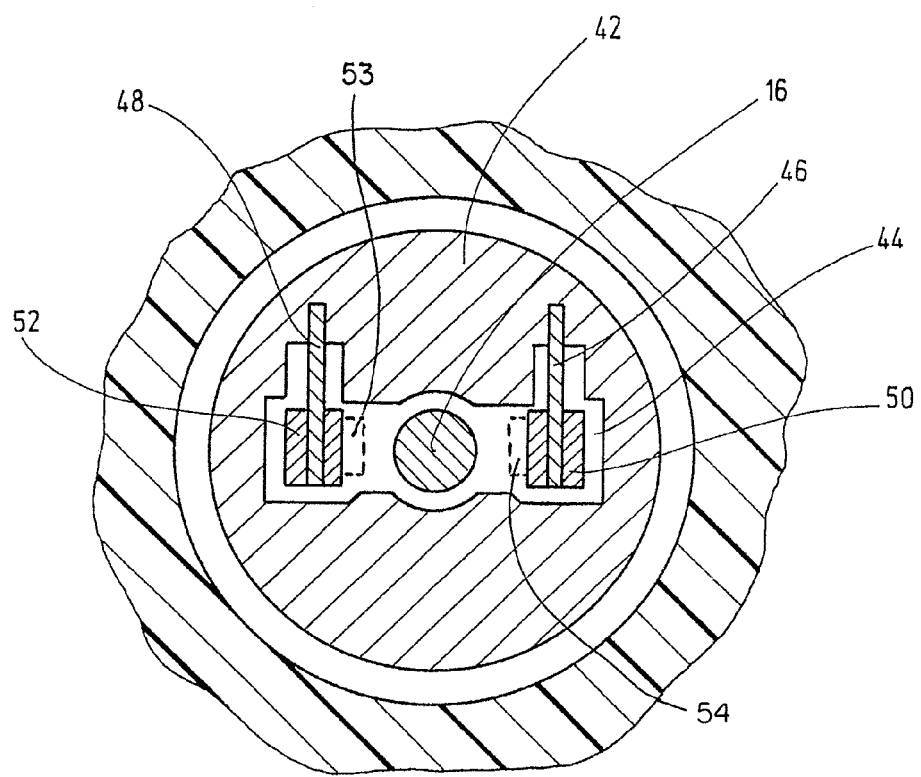
FIG. 2 shows a sectioned representation of the oscillating tool according to FIG. 1, taken along line II-II.

For vibration damping the oscillating tool 10 comprises an inertial mass 42 which is suspended for free oscillation on the housing 12, in the area of the motor shaft 16, as can be seen in more detail in FIG. 2. The inertial mass 42 has an annular shape and comprises a central opening 44 within which the inertial mass 42 is fixed directly on the housing by two mounting elements 50, 52, via two leaf spring elements 46, 48.

The inertial mass 42, in combination with the two leaf springs 46, 48, therefore form a spring-mass system that allows passive vibration damping. The resonant frequency of the spring-mass system is suitably tuned in that case to the resonant frequency/frequencies of the oscillation drive 13.

In the illustrated embodiment, an inertial mass of 100 g of the illustrated shape led to a resonant frequency of 300 Hz with harmonic frequencies in the range of 600 and 900 Hz so that effective vibration damping could be achieved especially in those domains. The acceleration values at 300 Hz and 900 Hz could be reduced to approximately 50% of the values obtained without the inertial mass 42.

In the case illustrated in FIG. 2, the inertial mass 42 is arranged on the end of the motor shaft 16, a short way before the transition to the eccentric portion 18.

However, different other arrangements are likewise imaginable, especially an arrangement of the inertial mass 42 at a point closer to the eccentric portion 18 or in the area of the eccentric portion 18. Further, the inertial mass 42 could also be arranged on the opposite end of the motor 14.

Finally, is would likewise be imaginable to make the spring characteristic of the spring elements 46, 48 variable, for example by the use of piezoelectric elements. In FIG. 2 two piezoelectric elements are indicated optionally by reference numeral 53. If desired, the spring elements 46, 48 as such could also be replaced by piezoelectric elements. A variable spring characteristic permits the resonant frequency of the spring-mass system, constituted by the spring elements 46, 48 and the inertial mass 42, to be adapted to the oscillations encountered during operation. This could also be achieved by an oscillation sensor, for example in the form of a piezo-electric sensor such as shown at 41 in FIG. 1, which would allow an automatic adaptation system. Alternatively, or in addition, a damping system might also be provided. A friction element (see reference numeral 54 in FIG. 2), may be used for damping, for example. Alternatively, piezoelectric elements such as shown at 53 in FIG. 2 may be used for damping the movement of the inertial mass 42.

What is claimed is:

1. An oscillating tool comprising:
   a housing;
   a motor received within said housing;
   a drive shaft for driving a tool;
   an oscillation drive driven by said motor for driving said drive shaft rotatingly oscillatingly about a longitudinal axis thereof; and
   an inertial mass having an annular shape with an inner cavity and comprising two slots extending from said cavity into said inertial mass; and two leaf springs fixed to said housing and fixed at free ends thereof within said slots extending into said inertial mass; and at least one piezoelectric element engaging said housing and said inertial mass for restricting movement of said inertial mass.

2. The oscillating tool of claim 1, wherein said inertial mass, said leaf springs and said at least one piezoelectric element define a spring-mass system having a resonant frequency that is tuned to an operating frequency of said oscillating tool.

3. An oscillating tool comprising:
a housing;
a motor received within said housing;
a drive shaft for driving a tool;
an oscillation drive driven by said motor for driving said drive shaft rotatingly oscillatingly about a longitudinal axis thereof; and
an inertial mass having an annular shape with an inner cavity and comprising at least two slots extending from said cavity into said inertial mass; and
at least two spring elements engaging said housing and said inertial mass for suspending said inertial mass movably within said housing;
wherein said at least two spring elements are fixed to said housing and at free ends thereof are fixed within said slots extending into said inertial mass.

4. The oscillating tool of claim 3, further comprising means for restricting movement of said inertial mass to one plane only.

5. The oscillating tool of claim 3, wherein at least one of said spring elements is configured as a leaf spring.

6. The oscillating tool of claim 3, wherein said oscillation drive comprises an eccentric shaft that is surrounded by said inertial mass.

7. The oscillating tool of claim 3, wherein said motor comprises a motor shaft that is surrounded by said inertial mass.

8. The oscillating tool of claim 3, wherein each of said spring elements has a variable spring characteristic.

9. The oscillating tool of claim 8, further comprising a piezoelectric element for varying said spring characteristic of said spring elements.

10. The oscillating tool of claim 3, further comprising a damping means for damping movement of said spring elements.

11. The oscillating tool of claim 3, wherein said inertial mass and said at least two spring elements define a spring-mass system having a resonant frequency that is tuned to an operating frequency of said oscillating tool.

12. The oscillating tool of claim 11, further comprising a vibration sensor that is coupled to at least one of said at least two spring elements for effecting adaptation of said resonant frequency of said spring-mass system to the resonant frequency of said oscillating tool during operation.

13. An oscillating tool comprising:
a housing;
a motor received within said housing;
a drive shaft for driving a tool;
an oscillation drive driven by said motor for driving said drive shaft rotatingly oscillatingly about a longitudinal axis thereof;
an inertial mass movably held within said housing by at least one spring element; and
an inner cavity formed within said inertial mass;
wherein said at least one spring element is fixed to said housing and secured at a free end thereof within said inner cavity of said inertial mass.

14. The oscillating tool of claim 13, wherein said inertial mass has an annular shape with an opening wherein at least one spring element engages said inertial mass.

15. The oscillating tool of claim 13, wherein said inertial mass and said at least one spring element define a spring-mass system having a resonant frequency that is tuned to an operating frequency of said oscillating tool.

* * * * *

UNITED STATES PATENT AND TRADEMARK OFFICE
CERTIFICATE OF CORRECTION

| | | |
|---|---|---|
| PATENT NO. | : 8,397,834 B2 | |
| APPLICATION NO. | : 12/726623 | |
| DATED | : March 19, 2013 | |
| INVENTOR(S) | : Mark Heilig et al. | |

It is certified that error appears in the above-identified patent and that said Letters Patent is hereby corrected as shown below:

Title Page:

Item (12), delete "Hellig et al." and insert -- Heilig et al. --.

Item (75) Inventors: should read, Mark Heilig, Winnenden (DE)

Signed and Sealed this
Fourth Day of June, 2013

Teresa Stanek Rea
*Acting Director of the United States Patent and Trademark Office*